United States Patent Office 3,135,485
Patented June 2, 1964

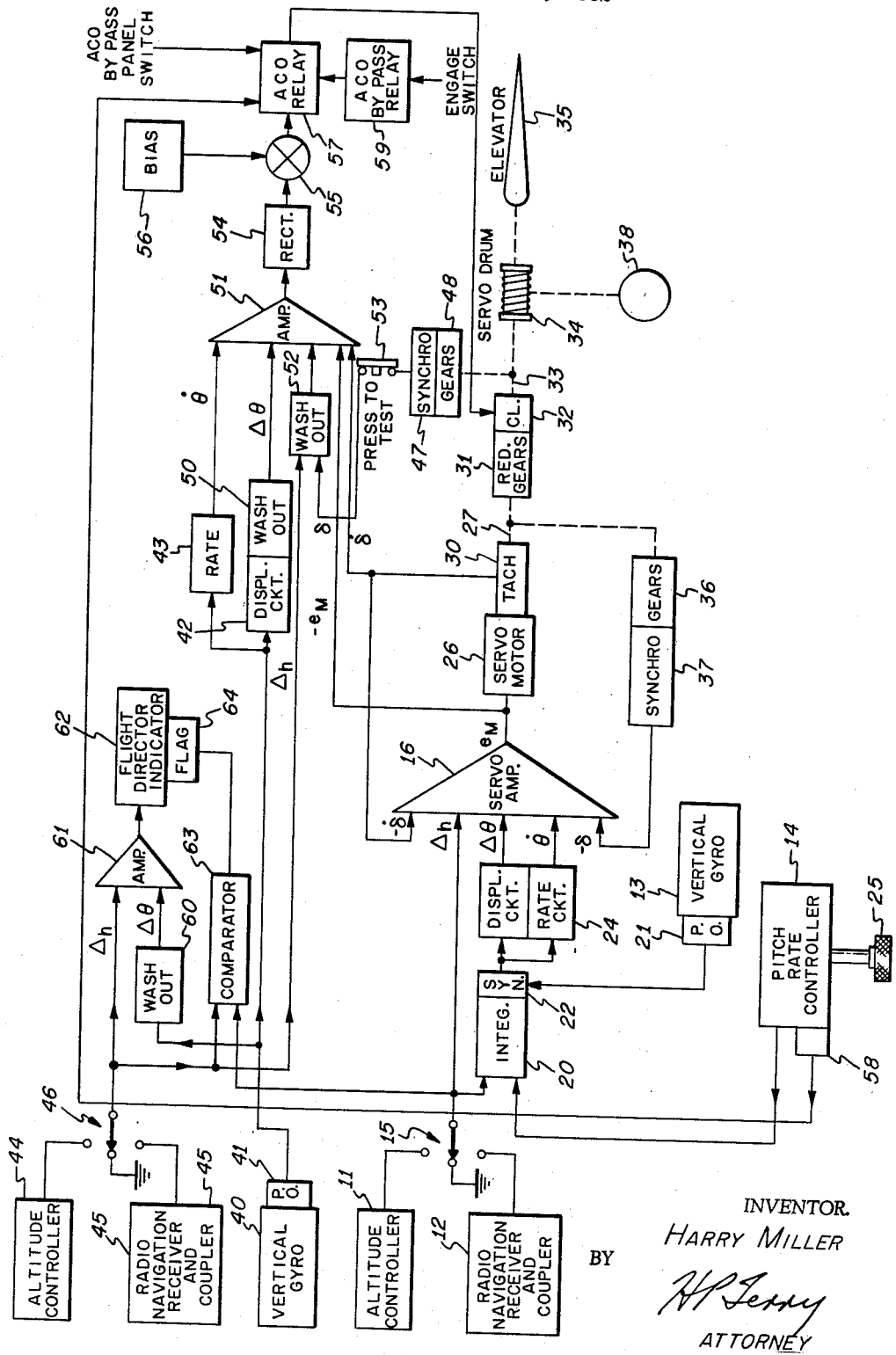

3,135,485
MONITORING APPARATUS FOR CONTROL SYSTEMS
Harry Miller, Scottsdale, Ariz., assignor to Sperry Rand Corporation, Great Neck, N.Y., a corporation of Delaware
Filed June 20, 1962, Ser. No. 203,871
1 Claim. (Cl. 244—77)

This invention relates to control systems and particularly to monitoring devices for control systems.

The invention is particularly adaptable to automatic pilot control systems for aircraft, for example, similar to that described in U.S. Patent 2,823,877, issued February 18, 1958 to J. J. Hess, Jr., entitled Control Systems for Dirigible Craft. The monitoring device of the present invention when adapted to automatic pilot systems provides a continuous check of the signals controlling the automatic pilot. Upon the occurrence of a malfunction in the control signal generating means, the automatic pilot system per se, or the monitoring system; a signal is provided which modifies the operation of the automatic pilot system or renders it ineffective.

The present invention provides several advantages over the prior art monitoring systems in that the present monitoring system is adaptable to detect automatic pilot malfunctions rapidly and to provide rapid command compensation thereby causing practically no change in the flight path of the aircraft. Further, the monitoring system of the present invention is compensated in order that it is not susceptible to nuisance engagements. In the event of malfunction of the automatic pilot system, an alternate guidance means is provided during manual operation of the aircraft. In addition, one portion of the monitoring system of the present invention is responsive to short term malfunctions while another portion of the monitoring system is responsive to long term malfunctions and discrete operation for each type of malfunction is provided.

It is a primary object of the present invention to provide a monitoring system effective to detect malfunctions in the primary control system as well as in the auxiliary control signal system.

It is a further object of the present invention to provide a monitoring device which discretely monitors long and short term malfunctions.

It is another object of the present invention to provide a monitoring system for an automatic pilot system which detects malfunctions rapidly and causes substantially no change in flight path when modifying the automatic pilot system.

It is a further object of the present invention to provide a monitoring device for an automatic pilot system which is not susceptible to nuisance disengagements.

It is an additional object of the present invention to provide a monitoring system for an automatic pilot system in which alternate guidance means is provided in the event the automatic pilot system malfunctions.

The above objects are achieved in the present invention by means of auxiliary signal generating means which provide signals in accordance with the deviation of the aircraft from a predetermined condition. The auxiliary signal generating means is identical to the primary signal generating means which provides primary control signals for the automatic pilot control system. The auxiliary control signals as well as signals representative of the primary composite control signal, the rate of change of the composite signal, and a signal representative of the position of the control surface are compared in a comparison means. The comparison means provides an output signal when its input signals are other than balanced. The output signal from the comparison means may be utilized, for example, to disengage a clutch in the automatic pilot system thereby rendering the automatic pilot system ineffective during short-term malfunctions. A flight director is responsive to the auxiliary control signals in order that the pilot can fly manually by being guided from the flight director in the event the automatic pilot system is rendered ineffective. The flight director includes a warning flag which provides an indication in the event of a long-term malfunction.

Other objects, features and advantages of the present invention will become apparent from the following description when read in conjunction with the drawing which is a schematic wiring diagram of the monitoring system of the present invention as utilized with an automatic pilot system for aircraft.

Referring to the drawing, the present invention will be described for purposes of example with respect to an automatic pilot system controlling the movement of an aircraft in pitch. It will be appreciated that the present invention is applicable to other types of control systems as well as to other axes of aircraft.

A conventional automatic pilot system 10 includes control signal generators in the form of an altitude controller 11, a radio navigation receiver and coupler 12, a vertical gyroscope 13 and a pitch rate controller 14. The automatic pilot system 10 is selectively responsive by means of a mode selection switch 15 to signals from the altitude controller 11 or the radio coupler 12. With the contact arm of the switch 15 in its upper position, the altitude controller 11 provides a signal representative of the deviation of the aircraft from a predetermined altitude to an input terminal of a summing amplifier 16. With the contact arm of the switch 15 in its intermediate position, the same input terminal is connected to ground potential. With the contact arm of the switch 15 in its lower position, the radio coupler 12 provides a signal to said input terminal representative of the vertical deviation of the aircraft from a radio defined flight path. The contact arm of the switch 15 is also connected to an input terminal of an integrating device 20.

The vertical gyro 13 has its pitch pick-off 21 connected to one input terminal of a differential synchro 20. The pitch pick-off 21 provides a signal representative of the pitch attitude of the aircraft which is connected through a differential synchro 22 to displacement and rate circuits 23 and 24, respectively. The displacement and rate circuits 23 and 24 are connected to respective input terminals of the summing amplifier 16. The pitch rate controller 14 is connected to another input terminal of the integrator 20 which in turn has its output connected to the differential synchro 22. Pitch command signals are introduced into the automatic pilot system 10 by manipulation and adjusting knob 25 on the pitch rate controller 14.

The output terminal of the summing amplifier 16 is connected to a servo motor 26. The output shaft 27 of the servo motor 26 is connected to a tachometer generator 30 which provides a rate feedback signal to an input terminal of the summing amplifier 16. The shaft 27 is also connected through reduction gearing 31 to one side of an electromagnetic clutch 32. The other side of the clutch 32 is connected by a shaft 33 to a servo drum 34, which in turn is connected to an elevator control surface 35. The shaft 27 of the servo motor 26 is also connected through reduction gearing 36 to a servo drum synchro pick-off 37 that provides a position feedback signal to another input terminal of the summing amplifier 16. A manually operable control member 38 is connected to the servo drum 34 for manually adjusting the position of the control surface 35. The automatic pilot system 10 described immediately above is similar to that described in said U.S. Patent 2,823,877 and its normal operation is fully disclosed therein.

The philosophy of the monitoring system of the present invention is based upon the fact that the sum of the signals entering the servo amplifier 16 is essentially zero during normal steady-state conditions. The resultant of these signals, i.e. the amplifier output signal, is indicated as $e_M$ in the drawing. To prevent damage to the aircraft structure and discomfort to the aircraft passengers, four of the signals entering the summing amplifier 16 are particularly significant from a hard-over malfunction viewpoint. The significant signals include pitch displacement, pitch rate, flight path displacement and position feedback.

A feature of the present invention is that the signals which monitor the four significant signals are obtained from signal generating means that are independent of the automatic pilot elevator channel. Thus, an auxiliary vertical gyroscope 40 has its pitch pick-off 41 connected to displacement and rate circuits 42 and 43, respectively, to provide pitch displacement and rate signals. An auxiliary altitude controller 44 and an auxiliary radio navigation receiver and coupler 45 are connected through an auxiliary mode selection switch 46 to alternatively provide signals representative of the deviation from a desired flight path in a manner similar to that described with respect to the primary altitude controller 11 and radio coupler 12, respectively. A servo drum synchro pick-off 47 is connected through reduction gearing 48 to the shaft 33 to provide a signal representative of the position of the elevator control surface 35 which is effectively compared with the position feedback signal from the synchro pick-off 37 in a manner to be described.

The displacement circuit 42 is connected through a washout or filtering circuit 50 having a long-time constant to an input terminal of a summing amplifier 51. The rate circuit 43 is connected to another input terminal of the summing amplifier 51. The switch 46 is connected through a washout or filtering circuit 55 having a long-time constant to an input terminal of the summing amplifier 51. The synchro pick-off 47 is connected through a press-to-test-switch 53 to the other input terminal of the washout circuit 52. The output terminal of the summing amplifier 16 is also connected to an input terminal of the summing amplifier 51 and the tachometer generator 30 is connected to another input terminal of the summing amplifier 51. The output terminal of the summing amplifier 51 is connected through a half-wave rectifier 54 to an input terminal of an algebraic summation device 55. A bias means 56 is connected to another input terminal of the summation device 55. The output terminal of the device 55 is connected to an automatic cut-off relay 57 which in turn is connected to the electromagnetic clutch 32. A bypass rate switch 58 in the pitch rate controller 14 is also connected to the relay 57. An engage switch as indicated by the legend connects the system energizing voltage through a bypass delay 59 to the relay 57 when initially energizing the system 10 in a manner to be explained. A panel mounted bypass switch as indicated by the legend also connects to the relay 57.

The pitch pick-off 49 of the vertical gyro 40 is connected through a washout or filtering circuit 60 having a long time constant to an input terminal of a summing amplifier 61. The contact arm of the switch 46 is also connected to another input terminal of the summing amplifier 61. The output terminal of the summing amplifier 61 is connected to actuate the pitch pointer of a flight director indicator 62. The flight director indicator 62 may be of the type disclosed in U.S. Patent 2,613,352, issued October 7, 1952 to S. Kellogg II, entitled Radio Navigation System and assigned to the same assignee as the present invention. The contact arms of the switches 15 and 46 are further connected to respective input terminals of a comparison device 63 which in turn is connected to a warning flag 64 that forms a portion of the flight director indicator 62.

The operation of the present invention will be described with respect to an aircraft making an approach. In the embodiment shown, the automatic cut-off portion of the monitoring system is implemented to detect sudden malfunctions of the automatic pilot system 10 while long term malfunctions are displayed on the flight director indicator 62 as a deviation indication or by the warning flag 64 coming into view. In the event of a sudden malfunction, the monitor derived simulation signals are not cancelled by the automatic pilot derived signals and the automatic cut-off relay 57 is de-energized thereby disengaging the clutch 32.

To prevent nuisance disengagements and to obtain fine adjustment of the cut-off circuitry, compensating signals including servo speed feedback and servo output force signals are added to the automatic cut-off portion of the system to render it comparable to the automatic pilot portion of the system. These two signals need not be derived from sources that are independent of the automatic system 10 since their failure will not cause undetected hard-over malfunctions.

The output $e_M$ of the servo summing amplifier 16 is representative of the composite level of the following signals:

Pitch attitude error, $\Delta\theta$
Pitch rate, $\dot{\theta}$
Path error, $\Delta h$
Servo displacement, $\delta$ and
Servo rate, $\dot{\delta}$ In a properly operating system, the magnitude of $e_M$ will be at null except when appreciable servo effort is required to move or to maintain deflection of the elevator control surface 35. The automatic trim system which is not shown will normally operate to relieve all long-term servo effort requirements. The short-period transients due to gusts, however, can result in appreciable momentary signals at the output of the servo amplifier 16. The automatic cut-off circuitry cannot simulate this effect since it does not have an equivalent servo that can reflect elevator control system reaction forces. It is thus essential to feed a signal proportional to servo effort into the automatic cut-off portion to avoid nuisance disengagements. The signal $e_M$ at the output of the servo amplifier 16 is proportional to servo force and is used for this purpose in the embodiment disclosed.

Of the five signals entering the amplifier 16, servo rate $\dot{\delta}$, path error $\Delta h$, and pitch rate $\dot{\theta}$ all operate around long-term null signal levels. The remaining two signals, i.e. pitch attitude error $\theta$ and servo displacement $\delta$, cancel each other on a long-period basis. The relationship between these signals represents the static gain of the system, normally expressed as degrees of elevator deflection per unit change in pitch attitude. The null level of both signals occurs simultaneously through the operation of the synchronization loop of the automatic pilot system prior to engagement and through the integrator 20 after engagement. Since the automatic cut-off portion does not have a synchronizing mechanism or an integrator, it is necessary to washout the steady-state signal levels of the vertical gyro 40, the radio coupler 45, and the synchro 47. This will not interfere with the operation of the automatic cut-off portion since its function is restricted to short-period monitoring only.

The output signal from the summing amplifier 51 is rectified in the half wave rectifier 54. The output of the rectifier 54, which is independent of phase, is algebraically summed in the summation device 55 with a bias signal from the biasing means 56. Under normal conditions, i.e. no output signal from the rectifier 54, the bias signal is of sufficient magnitude to maintain the relay 57 energized. In the event of a malfunction, when the signal from the rectifier 54 reaches a predetermined magnitude which cancels the bias signal, the relay 57 is de-energized thereby disengaging the clutch 32 which renders the automatic pilot system ineffective. The human pilot then manually controls the aircraft through the manual control member 38 while being guided by the information presented on the flight director indicator 62.

To test the automatic cut-off portion of the system, the Press-To-Test switch 52 is opened which momentarily disconnects the signal from the synchro 47. This should cause instantaneous disengagement of the clutch 32. This action does not cause a change in the flight path because the interrupted signal is not used in the pitch control channel.

Pitch maneuvering signals are inserted into the automatic pilot system 10 by manipulating the knob 25 on the pitch rate controller 14. Since this could cause disengagement, the automatic cut-off function is bypassed by means of the bypass rate switch 58 whenever the knob 25 is out of detent. This never exceeds a few seconds for any single maneuvering action. A short delay in automatic cut-off operation is provided by the bypass delay 59 upon initial engagement of the automatic pilot system 10.

The following presents an analysis of various failures which will trip the automatic cut-off relay 57.

A failure resulting in zero output from the position feedback synchro 37 will cause a sudden change in the signal $e_M$, which will trip the relay 57 immediately. If the failure occurs at the synchro's null position, the relay 57 will trip at the first gust disturbance of the airplane because there will be a disparity between the sum of the signals at the amplifier 57 compared to the sum of the signals at the amplifier 16 by virtue of the absence of one of the position feedback signals.

A failure resulting in zero output from the servo drum synchro 47 will cause a sudden change in the output of the washout circuit 52, thereby tripping the relay 57. Failure at null will cause a similar situation to that discussed immediately above.

A failure resulting in zero output from the vertical gyro differential synchro 22 will cause a sudden change in the signal $e_M$ which will trip the relay 57 immediately. If the failure were to occur at the synchro's null signal position, the relay 57 will trip at the first gust disturbance of the airplane because of the disparity between the signal summations in the amplifiers 16 and 51 by virtue of the absence of one of the gyro signals. An open failure of the displacement network 23 will cause a situation identical to gyro synchro failure. Any failure, passive or dynamic, in the rate-displacement circuitry 23, 24 will cause disparity between automatic pilot and monitor signals resulting in tripping the relay 57 and disengagement of the clutch 32.

A failure resulting in zero output from the monitor vertical gyro pick-off 41 will cause a sudden change in the output of the washout circuit 50 thereby tripping the relay 57 immediately. Other failures will result in similar action to that discussed in the preceding paragraph regarding the automatic pilot vertical gyro.

Failure of the servo rate feedback signal from the tachometer 30 will not cause the relay 57 to disengage. It will result in relatively rapid oscillatory movement of the manual control member 38 but no change in the flight path. The pilot will thus be adequately warned to disengage the automatic pilot system manually and use the flight director 62 for guidance.

A hard-over malfunction of the servo amplifier 16 will cause a sudden change in the signal $e_M$ thus tripping the relay 57. A zero output failure of the amplifier 16 will result in tripping the relay 57 at the first gust disturbance of the airplane. This will arise because the lack of proper surface reaction to the gust will not balance the monitor's vertical gyro displacement and rate signals.

Although the embodiment of the present invention disclosed in the drawing has been explained for purposes of simplicity with respect to an elevator servo system having a single command channel, the invention is also applicable to dual command channel servo systems of the character disclosed in U.S. Patent Application No. 186,528, filed April 10, 1962, entitled Discriminating Safety Monitor for Servo Systems, invented by J. C. Dendy.

Although the embodiment of the invention has been described utilizing auxiliary sensors for purposes of simplicity, it will be appreciated that in many aircraft redundant sensors are normally available, one set for the automatic pilot system and another set for the flight instrument system, in which event very little additional equipment is necessary to provide the monitoring and automatic cut-off functions described above.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

In an aircraft having a control surface for moving the same about an axis,
(1) automatic pilot means including motive means disengageably connected to said control surface,
(2) said automatic pilot means further including primary signal generating means for providing primary signals representative of pitch displacement, pitch rate, flight path displacement, position feedback and rate feedback,
(3) said automatic pilot means further including primary control means responsive to said primary signals for providing a composite signal representative of the resultant thereof for operating said motive means,
(4) auxiliary signal generating means for providing auxiliary signals in accordance with pitch displacement, pitch rate, flight path displacement, position feedback and rate feedback,
(5) auxiliary control means responsive to said auxiliary signals and to said composite signal for providing an output signal representative of the resultant thereof for detecting sudden malfunctions,
(6) means responsive to said output signal for immediately disengaging said motive means from said control surface in the presence of sudden malfunctions when said output signal exceeds a predetermined magnitude,
(7) means including comparison means responsive to said primary and auxiliary flight path displacement signals for providing a warning indication of long term malfunctions when there is a difference therebetween,
(8) means including flight director means responsive to said auxiliary pitch displacement and flight path displacement signals for providing a visual indication thereof,
(9) and manual control means connected to said control surface whereby in the event of a malfunction said automatic pilot is disengaged from said control surface without introducing a transient in the aircraft flight path and the human pilot may manually control the aircraft while being guided by the flight director presentation.

References Cited in the file of this patent

UNITED STATES PATENTS

| | | |
|---|---|---|
| 2,996,651 | Hammell | Aug. 15, 1961 |
| 3,008,077 | Osder | Nov. 7, 1961 |
| 3,034,032 | McWilliams | May 8, 1962 |
| 3,071,336 | Fearnside | Jan. 1, 1963 |

OTHER REFERENCES

Flight Magazine, London, Oct. 7, 1960.